(12) United States Patent
Challenger

(10) Patent No.: US 6,948,334 B1
(45) Date of Patent: Sep. 27, 2005

(54) FOOD SERVING CONTAINER

(76) Inventor: Jean Challenger, 1250 Old Bethlehem Rd., Quakertown, PA (US) 18951

( * ) Notice: Subject to any disclaimer, the term of this patent is extended or adjusted under 35 U.S.C. 154(b) by 0 days.

(21) Appl. No.: 10/764,395

(22) Filed: Jan. 23, 2004

(51) Int. Cl.[7] .......................... F25D 3/08; B65D 43/14
(52) U.S. Cl. .................. 62/457.6; 62/457.1; 62/457.2; 62/530; 220/252; 220/574.2; 220/592.01; 220/592.2
(58) Field of Search ............... 62/371, 457.6, 62/457.1, 457.2, 457.7, 530; 220/23.89, 62.13, 220/213, 252, 713, 592.15, 592.2, 574.2, 220/592.01

(56) References Cited

U.S. PATENT DOCUMENTS

| | | | |
|---|---|---|---|
| 181,909 A | * | 9/1876 | Chinnock .................... 220/252 |
| 1,333,051 A | * | 3/1920 | Young ......................... 220/252 |
| 2,064,411 A | * | 12/1936 | Brandstein ................... 215/321 |
| D218,697 S | * | 9/1970 | Angelakos ................... D7/603 |
| 3,715,895 A | * | 2/1973 | Devlin ....................... 62/457.3 |
| 3,810,446 A | * | 5/1974 | Kightlinger et al. ..... 119/61.55 |
| 4,163,374 A | * | 8/1979 | Moore et al. .............. 62/457.4 |
| 4,688,398 A | | 8/1987 | Baek |
| 4,981,234 A | * | 1/1991 | Slaughter ................... 62/457.1 |
| 5,005,374 A | * | 4/1991 | Spitler ....................... 62/259.3 |
| D343,058 S | * | 1/1994 | Allegre ........................ D3/294 |
| 5,345,784 A | * | 9/1994 | Bazemore et al. ............ 62/371 |
| 5,423,194 A | * | 6/1995 | Senecal ..................... 62/457.6 |
| 5,579,946 A | * | 12/1996 | Rowan et al. ......... 220/592.27 |
| 5,701,757 A | * | 12/1997 | Heverly ..................... 62/457.2 |
| 6,029,457 A | | 2/2000 | Neeser et al. |
| 6,151,910 A | * | 11/2000 | Hazen ....................... 62/457.2 |

* cited by examiner

Primary Examiner—Cheryl J. Tyler
Assistant Examiner—Richard L. Leung

(57) ABSTRACT

A food serving container for keeping food articles chilled while being served. The food serving container includes an exterior bowl member designed for being positioned on a support surface. A cooling member is selectively positioned against an interior surface of the exterior bowl member. The cooling member is designed for being frozen. An interior bowl member is selectively coupled to the exterior bowl member whereby the cooling member is positioned between the interior bowl member and the external bowl member when the cooling member is positioned against the exterior bowl member and the interior bowl member is coupled to the exterior bowl member. The interior bowl member is substantially concave whereby the interior bowl member is designed for receiving the food articles. The cooling member is designed for cooling the food articles in the interior bowl member to inhibit spoiling of the food articles positioned in the interior bowl member.

1 Claim, 5 Drawing Sheets

FOOD SERVING CONTAINER

BACKGROUND OF THE INVENTION

1. Field of the Invention

The present invention relates to insulated containers and more particularly pertains to a new food serving container for keeping food articles chilled while being served.

2. Description of the Prior Art

The use of insulated containers is known in the prior art. U.S. Pat. No. 4,688,398 describes a device for containing an article that is frozen and maintains the article in a frozen for a period of time. Another type of insulated container is U.S. Pat. No. 6,029,457 having a receptacle with an interior shell joined to an exterior shell to allow perishables to be kept at a reduced temperature. U.S. Pat. No. 4,981,234 has an inner shell surrounded by an outer shell with a gelatinous compound positioned between the inner shell and the outer shell to keep food items cold.

While these devices fulfill their respective, particular objectives and requirements, the need remains for a device that has certain improved features allowing for the cooling portion to be removed and refrozen.

SUMMARY OF THE INVENTION

The present invention meets the needs presented above by an interior bowl member that is separable from an exterior bowl member with a cooling member positioned between the exterior bowl member and the interior bowl portion to cool food articles placed in the interior bowl member.

Still yet another object of the present invention is to provide a new food serving container that maintains the food articles to remain cool and inhibit spoiling of the food articles while the food articles are being served.

Even still another object of the present invention is to provide a new food serving container that reduces the amount of area needed to store when not in use.

To this end, the present invention generally comprises an exterior bowl member being substantially concave. The exterior bowl member is designed for being positioned on a support surface. A cooling member is selectively positioned against an interior surface of the exterior bowl member. The cooling member is designed for being frozen. An interior bowl member is selectively coupled to the exterior bowl member whereby the cooling member is positioned between the interior bowl member and the external bowl member when the cooling member is positioned against the exterior bowl member and the interior bowl member is coupled to the exterior bowl member. The interior bowl member is substantially concave whereby the interior bowl member is designed for receiving the food articles. The cooling member is designed for cooling the food articles in the interior bowl member to inhibit spoiling of the food articles positioned in the interior bowl member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
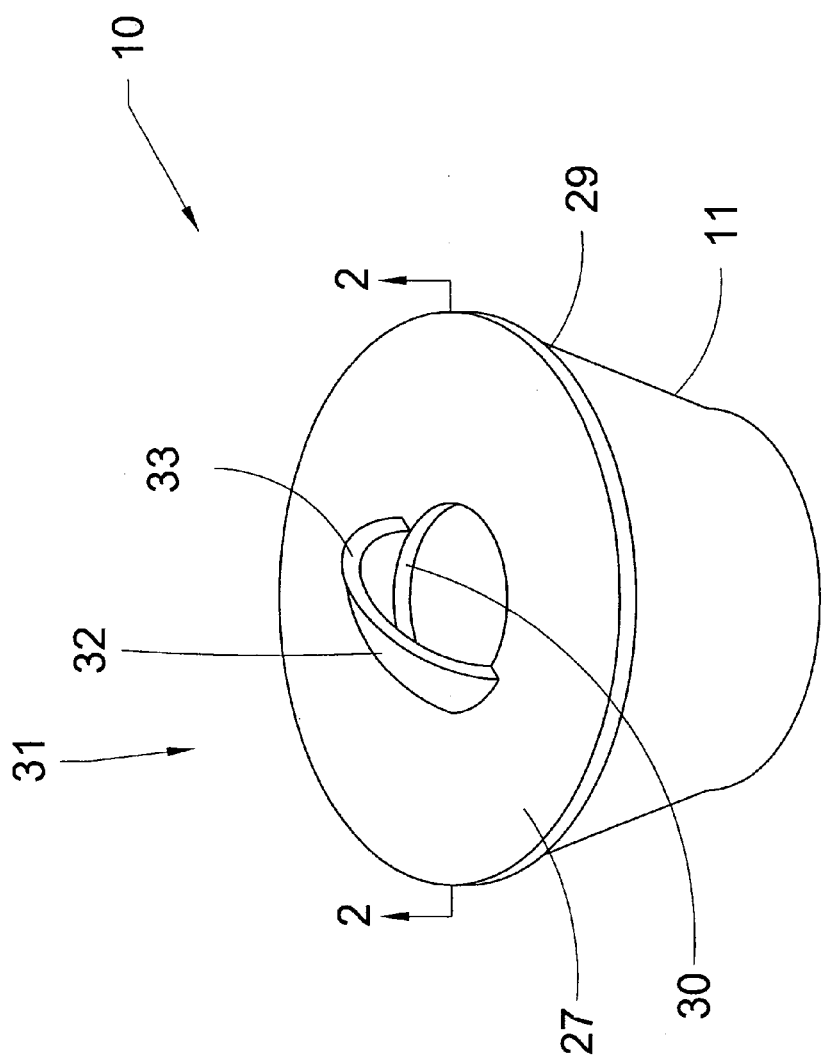
FIG. 1 is a perspective view of a new food serving container according to the present invention.
Figure 2:
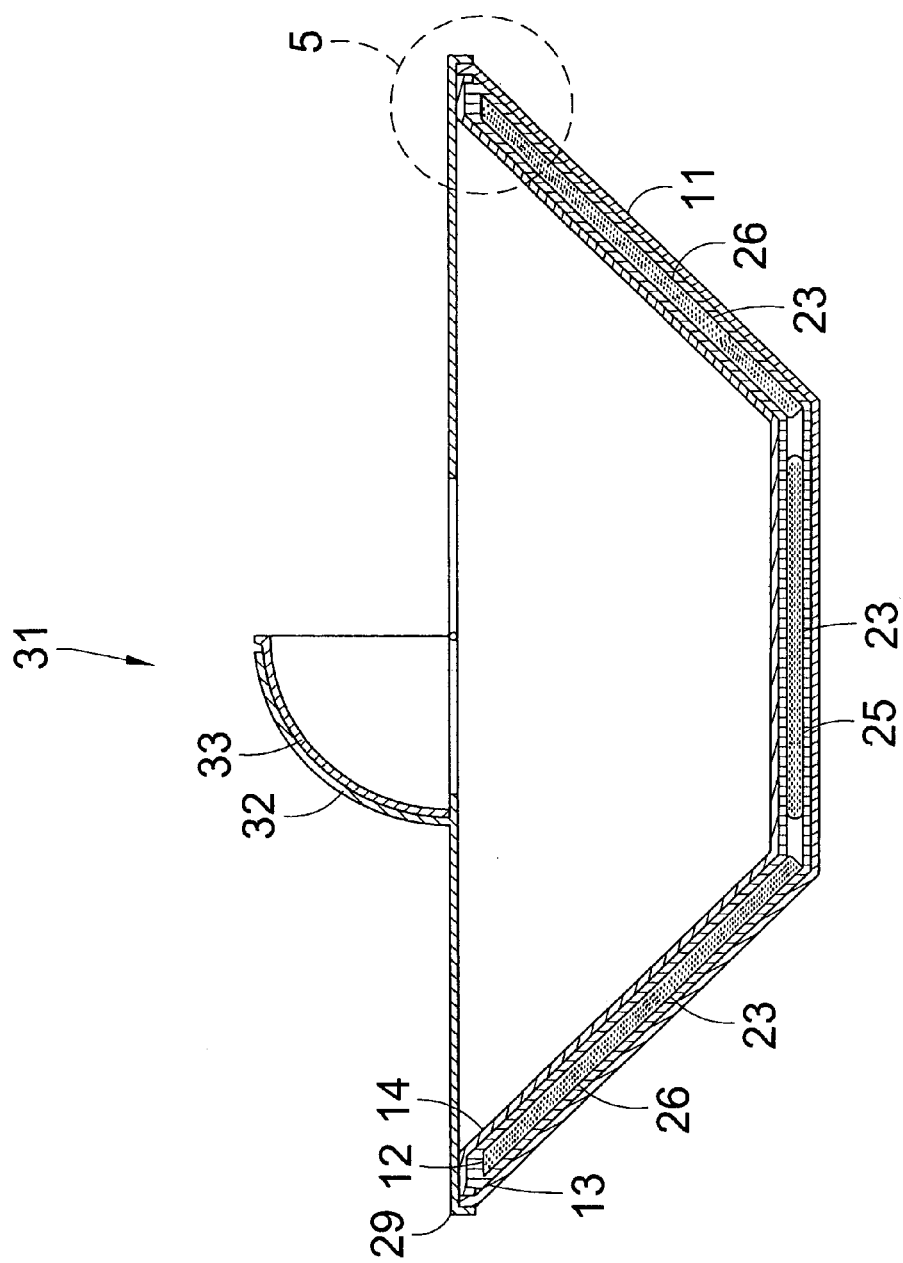
FIG. 2 is a cross-sectional view of the present invention taken along line 2—2 of FIG. 1, with a circle indicating the portion of this view that is shown in an enlarged manner in FIG. 5.
Figure 3:
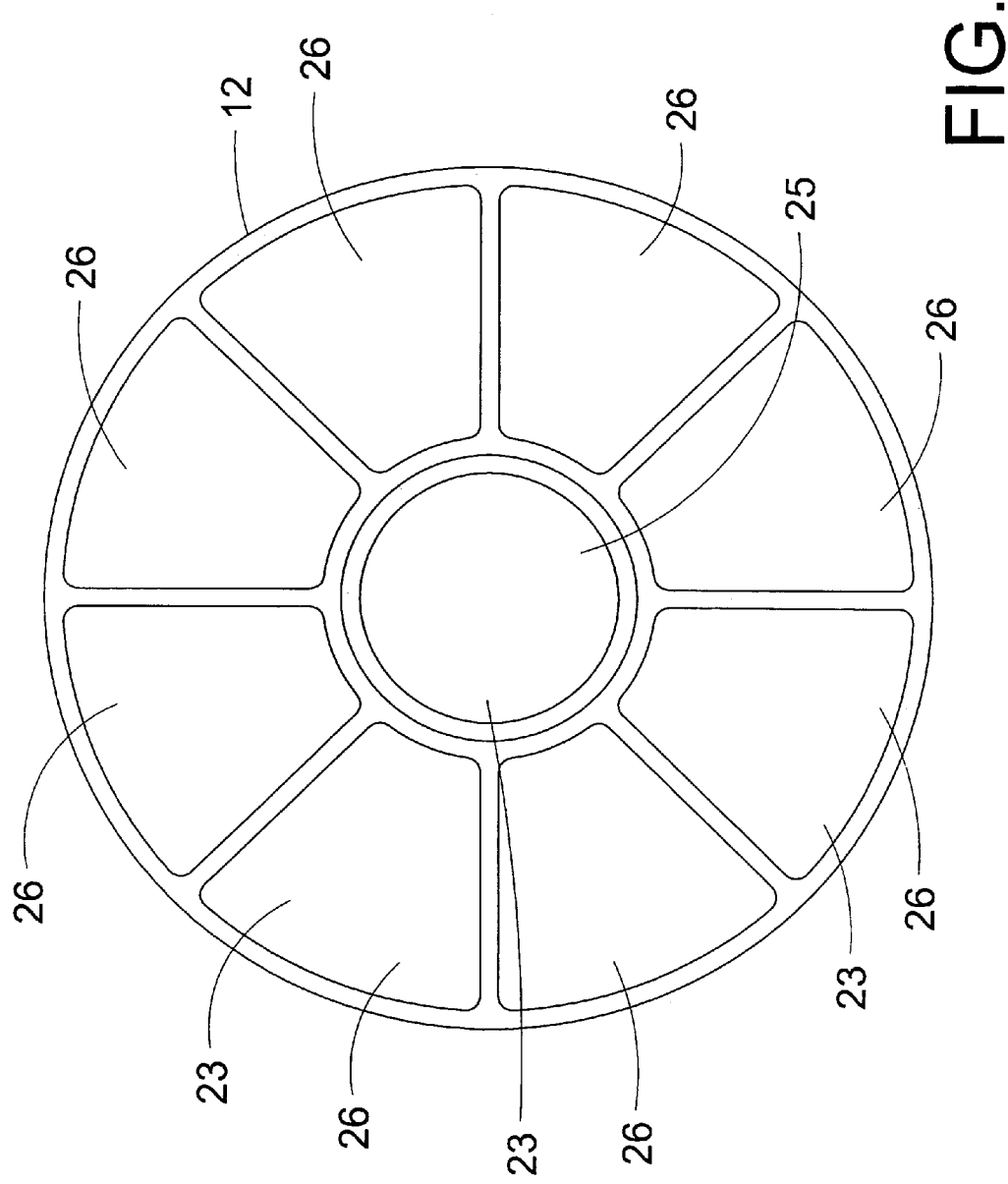
FIG. 3 is a top view cooling member of the present invention.
Figure 4:
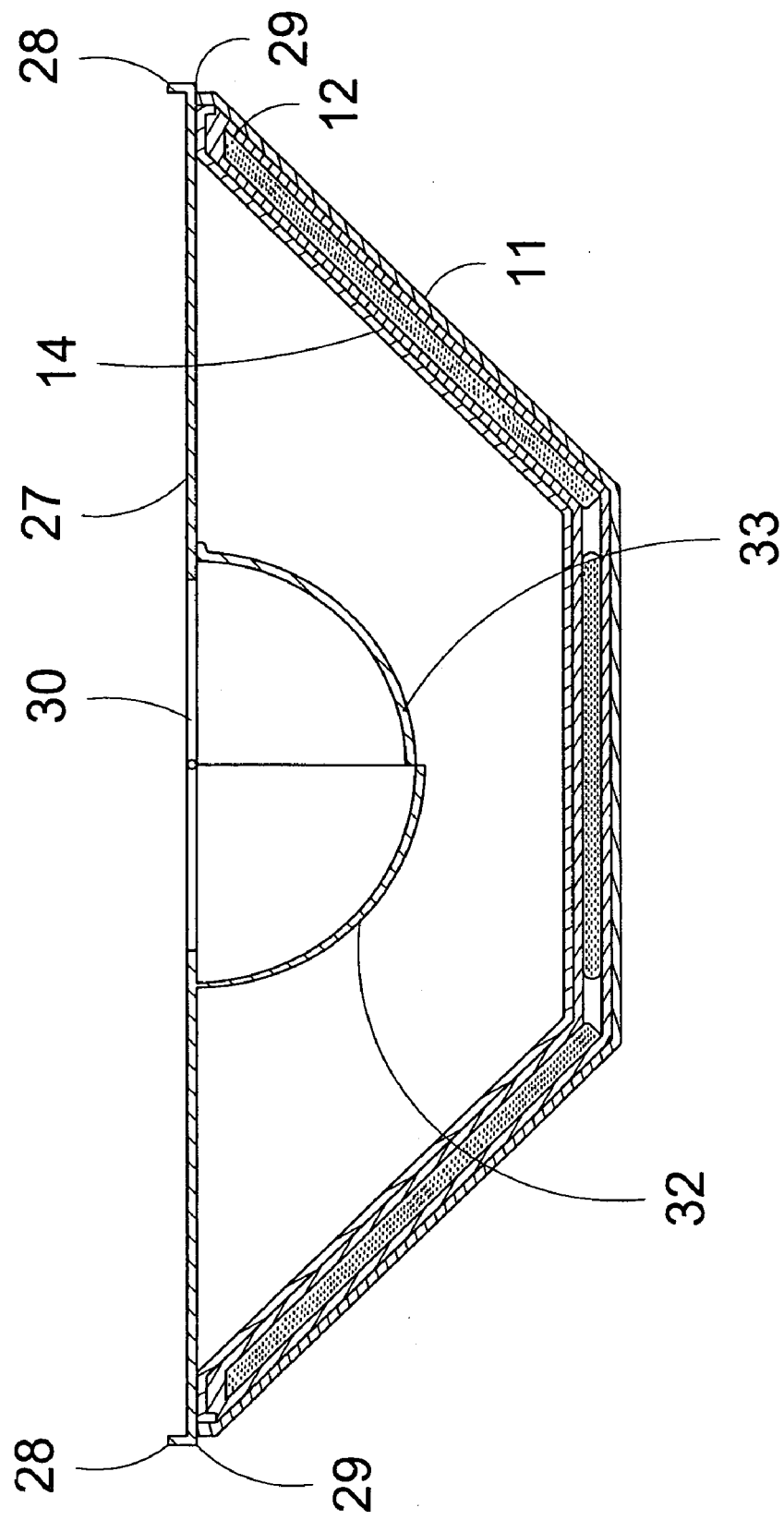
FIG. 4 is a cross-section view of the present invention with the lid member shown positioned for storage.
Figure 5:
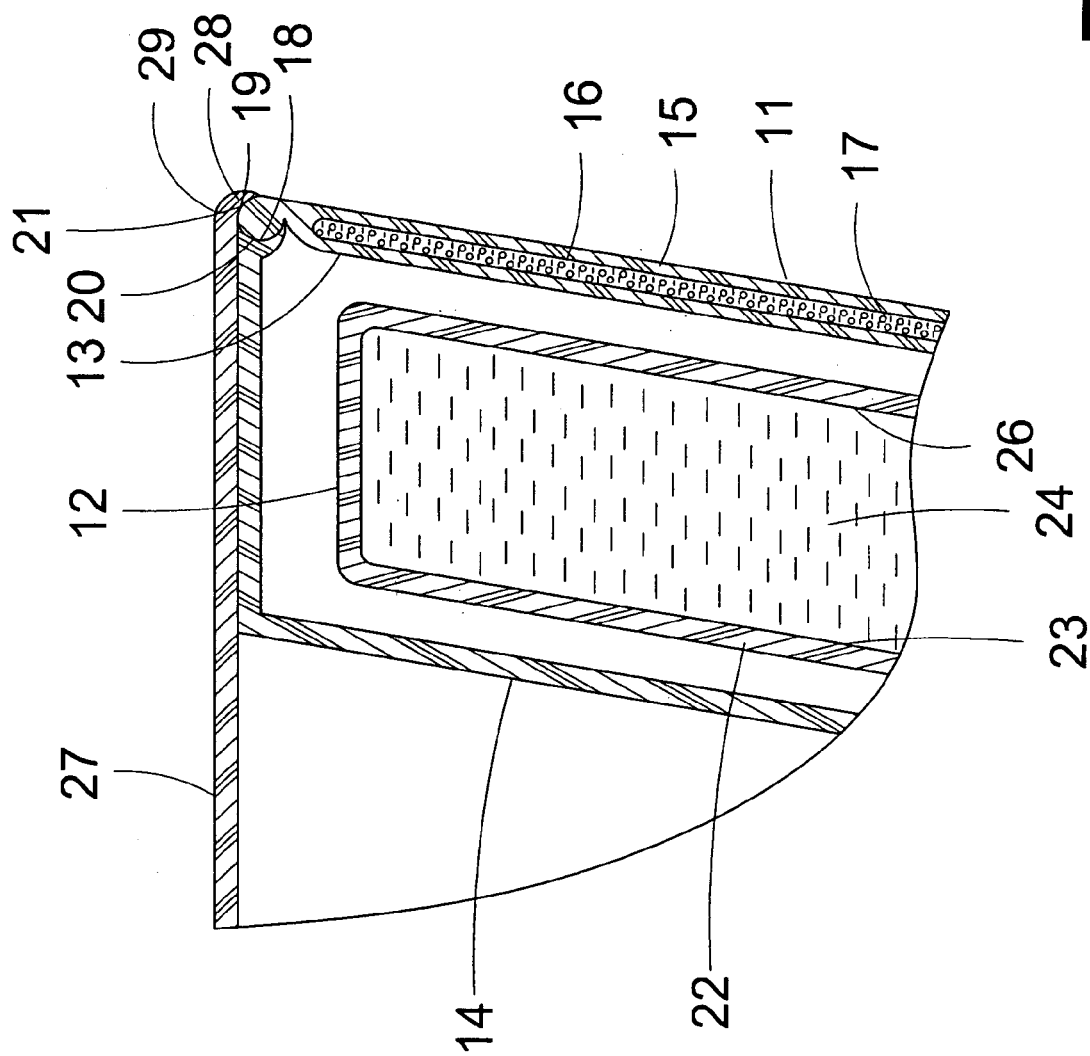
FIG. 5 is a portion of cross-section view of the present invention shown in FIG. 2 enlarged for magnification purposes.

With reference now to the drawings, and in particular to FIGS. 1 through 5 thereof, a new food serving container embodying the principles and concepts of the present invention and generally designated by the reference numeral 10 will be described.

As best illustrated in FIGS. 1 through 5, the food serving container 10 generally comprises an exterior bowl member 11 being designed for being positioned on a support surface.

A cooling member 12 is selectively positioned against an interior surface 13 of the exterior bowl member 11. The cooling member 12 is designed for being frozen.

An interior bowl member 14 is selectively coupled to the exterior bowl member 11 whereby the cooling member 12 is positioned between the interior bowl member 14 and the external bowl member when the cooling member 12 is positioned against the exterior bowl member 11 and the interior bowl member 14 is coupled to the exterior bowl member 11. The interior bowl member 14 is substantially concave whereby the interior bowl member 14 is designed for receiving the food articles. The cooling member 12 is designed for cooling the food articles in the interior bowl member 14 to inhibit spoiling of the food articles positioned in the interior bowl member 14.

The exterior bowl member 11 comprises a peripheral wall 15. The peripheral wall 15 defines an interior space 16 of the exterior bowl member 11. The interior space 16 of the exterior bowl is for insulating the cooling member 12 from heat transferring through the peripheral wall 15 of the exterior bowl member 11.

The interior space 16 of the exterior bowl member 11 contains an insulating fluid 17. The insulating fluid 17 is for inhibiting thermal transfer through the exterior bowl member 11. The insulating fluid 17 comprises a substantially inert gas, such as nitrogen. The substantially inert gas provides insulation for the cooling member 12 to insulate the cooling member 12 from heat outside of the exterior bowl member 11.

The exterior bowl member 11 comprises a lip member 18 extending inwardly from a top edge 19 of the exterior bowl member 11. The interior bowl member 14 comprises an indentation 20 extending into the interior bowl member 14 from a peripheral edge 21 of the interior bowl member 14. The indentation 20 of the interior bowl member 14 selectively receives the lip member 18 of the exterior bowl member 11 to selectively secure the interior bowl member 14 to the exterior bowl member 11.

The cooling member 12 comprises a perimeter wall 22. The perimeter wall 22 defines a plurality of compartments 23 of the cooling member 12. Each of the compartments 23 is for containing a gelatinous compound 24. The gelatinous compound 24 is designed for being frozen whereby the gelatinous compound 24 is for chilling the food articles positioned in the interior bowl member 14.

The compartments 23 of the cooling member 12 comprise a base compartment 25 and a plurality of wall compartments 26. The base compartment 25 is positioned adjacent a base portion of the exterior bowl member 11 when the cooling member 12 is positioned against the exterior bowl member 11. The wall compartments 26 of the cooling member 12 are radially positioned around the base compartment 25 whereby the wall compartments 26 are positioned against a wall portion of the exterior bowl member 11 when the cooling member 12 is positioned against the exterior bowl member 11.

A lid member 27 is selectively coupled to the interior bowl member 14. The lid member 27 is positioned opposite the exterior bowl member 11. The lid member 27 is designed for maintaining positioning of the food articles in the interior bowl member 14 to inhibit the food articles from being inadvertently spilled from the interior bowl member 14 when the lid member 27 is coupled to the interior bowl member 14.

The lid member 27 comprises a hook portion 28 extending downwardly from a perimeter edge 29 of the lid member 27. The hook portion 28 selectively extends over the peripheral edge 21 of the interior bowl member 14 to secure the lid member 27 to the interior bowl member 14 when the lid member 27 is coupled to the interior bowl member 14.

The lid member 27 comprises a serving aperture 30 extending through the lid member 27. The serving aperture 30 permits access to the interior bowl member 14 whereby the serving aperture 30 is designed for permitting the food articles to be retrieved from the interior bowl member 14 when the lid member 27 is coupled to the interior bowl member 14.

A cover assembly 31 is coupled to the lid member 27. The cover assembly 31 is selectively positioned over the serving aperture 30 of the lid member 27 whereby the cover assembly 31 is designed for selectively limiting access the food articles in the interior bowl member 14 when the cover assembly 31 is positioned over the serving aperture 30 of the lid member 27.

The cover assembly 31 comprises a dome member 32 and a shell member 33. The dome member 32 is coupled to the lid member 27 whereby the dome member 32 is positioned over a portion of the serving aperture 30 of the lid member 27. The shell member 33 is pivotally coupled to the lid member 27 whereby the shell member 33 is for selectively covering the portion of the serving aperture 30 not covered by the dome member 32. The shell member 33 is nested with the dome member 32 to permit access to the serving aperture 30 when the shell member 33 is pivoted with respect to the lid member 27. The dome member 32 of the cover assembly 31 is substantially hemispherical shaped. The shell member 33 of the cover assembly 31 is substantially hemispherical shaped. The shell member 33 comprises a radius less than a radius of the dome member 32 whereby the shell member 33 pivots under the dome member 32 when the shell member 33 is pivoted with respect to the lid member 27.

In use, the user places the cooling member 12 into the freezer and allows the gelatinous compound 24 within the compartments 23 of the cooling member 12 to become cold. The cooling member 12 is then placed in the exterior bowl member 11 and the interior bowl member 14 is coupled to the exterior bowl member 11 to maintain positioning of the cooling member 12. The food articles can then be placed in the interior bowl member 14 to be served and kept cold by the cooling member 12. The lid member 27 is selectively coupled to the interior bowl member 14 to inhibit the food articles positioned in the interior bowl member 14 from being inadvertently spilled. The shell member 33 of the cover assembly 31 can be pivoted to allow access to the serving aperture 30 of the lid member 27 and allow the food articles to be served from the interior bowl member 14. To facilitate storage, the lid member 27 may be flipped upside down to allow the cover member to be positioned in the interior bowl member 14 to take up less space during storage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food serving container for keeping food articles chilled, the food serving container comprising:

an exterior bowl member being adapted for being positioned on a support surface;

a cooling member being selectively positioned against an interior surface of said exterior bowl member, said cooling member being adapted for being frozen;

an interior bowl member being selectively coupled to said exterior bowl member to form a chamber between said interior bowl member and said exterior bowl member such that said cooling member is positioned between said interior bowl member and said external bowl member when said cooling member is positioned against said exterior bowl member and said interior bowl member is coupled to said exterior bowl member, said interior bowl member being substantially concave for receiving the food articles, said cooling member cooling the food articles in said interior bowl member to inhibit spoiling of the food articles positioned in said interior bowl member;

a lid member removably mountable on said interior bowl member and said exterior bowl member, a serving aperture extending through said lid member such that contents of said interior bowl member is accessible without removing any portion of said lid member from mounting on said bowl members;

said exterior bowl member comprising a peripheral wall, said peripheral wall defining closed interior space of said exterior bowl member, said interior space of said exterior bowl member being isolated from said cooling member when said cooling member is positioned between said interior bowl member and said exterior bowl member for insulating said cooling member from heat transferring through said peripheral wall of said exterior bowl member;

said interior space of said exterior bowl member containing an insulating fluid, said insulating fluid being for inhibiting thermal transfer through said exterior bowl member;

said insulating fluid comprising a substantially inert gas, said substantially inert gas providing insulation for said cooling member to insulate said cooling member from heat outside of said exterior bowl member;

said exterior bowl member comprising a lip member extending inwardly from a top edge of said exterior bowl member, said interior bowl member comprising an indentation extending into said interior bowl member from a peripheral edge of said interior bowl member, said indentation of said interior bowl member selectively receiving said lip member of said exterior bowl member to selectively secure said interior bowl member to said exterior bowl member;

said cooling member comprising a perimeter wall, said perimeter wall defining a plurality of compartments of said cooling member, each of said compartments being for containing a gelatinous compound, said gelatinous compound being adapted for being frozen such that said gelatinous compound is for chilling the food articles positioned in said interior bowl member; and said compartments of said cooling member comprising a base compartment and a plurality of wall compartments, said base compartment being positioned adjacent a base portion of said exterior bowl member when said cooling member is positioned against said exterior bowl member, said wall compartments of said cooling member being radially positioned around said base compartment such that said wall compartments are positioned against a wall portion of said exterior bowl member when said cooling member is positioned against said exterior bowl member;

a cover assemble being coupled to said lid member, said cover assembly being positioned over said serving aperture of said lid member such that said cover assembly is movable between a closed position and an open position, said open position permitting access to food articles in said interior bowl member through said serving aperture, said closed position selectively limiting access to the food articles in said interior bowl member through said serving aperture;

said cover assembly comprising a dome member and a shell member, said dome member being coupled to said lid member such that said dome member is positioned over a portion of said serving aperture of said lid member, said shell member being pivotally coupled to said lid member such that said shell member is for selectively coveting the portion of said serving aperture not covered by said dome member, said shell member being nested with said dome member to permit access to said serving aperture when said shell member is pivoted with respect to said lid member;

said dome member of said cover assembly being substantially hemispherical shaped, said shell member of said cover assembly being substantially hemispherical shaped, said shell member having a radius less than a radius of said dome member such that said shell member is pivotable inside said dome member when said shell member is pivoted with respect to said lid member.

* * * * *